United States Patent
Benson

(10) Patent No.: US 9,234,464 B2
(45) Date of Patent: Jan. 12, 2016

(54) FUEL METERING SYSTEM ELECTRICALLY SERVOED METERING PUMP

(71) Applicant: HONEYWELL INTERNATIONAL INC., Morristown, NJ (US)

(72) Inventor: Dwayne Michael Benson, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 140 days.

(21) Appl. No.: 14/079,281

(22) Filed: Nov. 13, 2013

(65) Prior Publication Data

US 2014/0053530 A1     Feb. 27, 2014

Related U.S. Application Data

(62) Division of application No. 12/652,273, filed on Jan. 5, 2010, now Pat. No. 8,584,441.

(51) Int. Cl.
| F02C 7/22 | (2006.01) |
| F01B 3/10 | (2006.01) |
| F04B 1/32 | (2006.01) |
| F02C 7/232 | (2006.01) |

(52) U.S. Cl.
CPC . *F02C 7/22* (2013.01); *F01B 3/106* (2013.01); *F02C 7/232* (2013.01); *F04B 1/324* (2013.01); *Y02T 50/671* (2013.01)

(58) Field of Classification Search
CPC ............... F02C 7/22; F02C 9/26; F02C 9/30; F04B 1/324; F04B 49/08; F01B 3/106; F01B 3/007
See application file for complete search history.

(56) References Cited

U.S. PATENT DOCUMENTS

| 3,374,622 | A |   | 3/1968 | Thomas |
| 3,941,514 | A |   | 3/1976 | Louis et al. |
| 4,216,699 | A |   | 8/1980 | Born et al. |
| 4,379,389 | A |   | 4/1983 | Liesener |
| 4,715,788 | A | * | 12/1987 | Kouns et al. ............ F04B 1/324 |
|   |   |   |   | 417/218 |
| 5,490,379 | A |   | 2/1996 | Wernberg et al. |
| 5,868,555 | A |   | 2/1999 | Shimotomai |
| 5,881,629 | A |   | 3/1999 | Gollner et al. |
| 5,975,858 | A |   | 11/1999 | Shimotomai |
| 6,102,001 | A |   | 8/2000 | McLevige |
| 6,443,705 | B1 |   | 9/2002 | Munoz |
| 6,454,033 | B1 |   | 9/2002 | Nathan et al. |

(Continued)

FOREIGN PATENT DOCUMENTS

GB        1022258   *  3/1966 ................. F02C 9/16

OTHER PUBLICATIONS

USPTO Notice of Allowance for U.S. Appl. No. 14/079,264; Notification Date Sep. 3, 2015.

*Primary Examiner* — Andrew Nguyen
(74) *Attorney, Agent, or Firm* — Ingrassia Fisher & Lorenz, P.C.

(57) ABSTRACT

A fuel metering system for supplying fuel to load includes a variable displacement piston pump having an adjustable hanger that is movable to a plurality of positions. The variable displacement piston pump is configured to receive a drive torque and, upon receipt of the drive torque, to supply fuel to the plurality of loads at a flow rate dependent on the position of the adjustable hanger. A hanger actuator is coupled to receive hanger position commands and is operable, in response thereto, to move the adjustable hanger to the commanded position.

7 Claims, 5 Drawing Sheets

(56) References Cited

U.S. PATENT DOCUMENTS

| | | |
|---|---|---|
| 6,623,247 B2 | 9/2003 | Du |
| 6,675,570 B2 | 1/2004 | Herbison et al. |
| 7,252,068 B2 | 8/2007 | Eick et al. |
| 7,401,461 B2 | 7/2008 | Eick et al. |
| 7,503,173 B2 | 3/2009 | Dong et al. |
| 2004/0223856 A1 | 11/2004 | Rembold et al. |
| 2005/0058551 A1 | 3/2005 | Wakita et al. |
| 2009/0199823 A1 | 8/2009 | Mahoney et al. |

* cited by examiner

FUEL METERING SYSTEM ELECTRICALLY SERVOED METERING PUMP

CROSS-REFERENCE TO RELATED APPLICATION

This application is a divisional of application Ser. No. 12/652,273, filed Jan. 5, 2010, now U.S. Pat. No. 8,584,441.

TECHNICAL FIELD

The present invention generally relates to fuel metering systems and, more particularly, to fuel metering systems that supply sufficient fuel flow with minimal heat input to the fuel.

BACKGROUND

Typical gas turbine engine fuel supply systems include a fuel source, such as a fuel tank, and one or more pumps that draw fuel from the fuel tank and deliver pressurized fuel to the fuel manifolds in the engine combustor via a main supply line. The main supply line may include one or more valves in flow series between the pumps and the fuel manifolds. These valves generally include at least a metering valve and a pressurizing-and-shutoff valve downstream of the metering valve. In addition to the main supply line, many fuel supply systems may also include a bypass flow line connected upstream of the metering valve that bypasses a portion of the fuel flowing in the main supply line back to the inlet of the one or more pumps, via a bypass valve. The position of the bypass valve is controlled to maintain a substantially fixed differential pressure across the main metering valve.

Although the above-described fuel supply system configuration is generally safe and reliable, it can suffer certain drawbacks depending on the particular aircraft configuration. For example, these fuel systems can exhibit undesirable levels of fuel heating due to the continuous flow of fuel through the bypass valve and fuel pump. Commonly, the waste heat that is generated in an aircraft is cooled by the engine fuel supply system so that the heat can subsequently be extracted in the gas turbine engine. However, in many systems it is not possible to sink all of the waste heat into the fuel due to maximum temperature limits on the fuel and fuel wetting components. This may result in adding a heat exchanger in the engine fan ducts, which can introduce additional weight and noise, and can also reduce net engine thrust.

Hence, there is a need for a gas turbine engine fuel supply system that does not increase fuel temperature to undesirable levels during operation and/or does not rely on additional heat exchangers. The present invention addresses at least these needs.

BRIEF SUMMARY

In one embodiment, and by way of example only, a fuel metering system for supplying fuel to a load includes a gas turbine engine controller, a variable displacement piston pump, a hanger actuator, a first piston, a servo valve, a second piston, and an electromechanical actuator. The gas turbine engine controller is adapted to receive throttle input commands and is configured, in response thereto, to supply hanger position commands The variable displacement piston pump includes an adjustable hanger that is movable to a plurality of positions. The variable displacement piston pump is configured to receive a drive torque and, upon receipt of the drive torque, to supply fuel to the load at a flow rate that is dependent on drive speed and adjustable hanger position. The hanger actuator is coupled to receive the hanger position commands and is configured, in response thereto, to move the adjustable hanger to the commanded position. The hanger actuator includes a first piston, a servo valve, a second piston, and an electromechanical actuator. The first piston engages the adjustable hangar and is coupled to receive a first force. The first piston is responsive to the first force to supply a hangar position force to the adjustable hanger. The servo valve is coupled to receive a spring force and is configured, upon receipt thereof, to control the first force that is supplied to the first piston. The second piston engages the adjustable hangar and is coupled to receive fuel at the discharge pressure. The second piston is configured to supply a pressure control force to the adjustable hangar that opposes the hanger position force. The electromechanical actuator is coupled to receive the hanger position commands and is configured, in response thereto, to control the first force that is supplied to the first piston. The electromechanical actuator includes an electric motor, an actuator, and a bias spring. The electric motor is configured to be selectively energized and, upon being selectively energized, supply an actuation drive torque. The actuator is coupled to receive the actuation drive torque from the electric motor and control the first force that is supplied to the first piston. The bias spring is coupled between the actuator and the servo valve and is configured to supply the spring force to the servo valve.

In another exemplary embodiment, a fuel metering system for supplying fuel to a load includes a variable displacement piston pump, a position sensor, a pressure sensor, a gas turbine engine controller, a hanger actuator, a first piston, a servo valve, a second piston, and an electromechanical actuator. The variable displacement piston pump includes an adjustable hanger that is movable to a plurality of positions. The variable displacement piston pump is configured to receive a drive torque and, upon receipt of the drive torque, to supply fuel to the load at a flow rate and a discharge pressure that are dependent on drive speed and adjustable hanger position. The position sensor is coupled to the variable displacement piston pump and is configured supply a position signal representative of hangar position. The pressure sensor is configured to sense the discharge pressure and supply a pressure signal representative thereof The gas turbine engine controller is coupled to receive throttle input commands and the position signal and is configured, in response thereto, to supply hanger position commands. The hanger actuator is coupled to receive the hanger position commands and is configured, in response thereto, to move the adjustable hanger to the commanded position. The hanger actuator includes a first piston, a servo valve, a second piston, and an electromechanical actuator. The first piston engages the adjustable hangard and is coupled to receive a first force. The first piston is responsive to the first force to supply a hangar position force to the adjustable hanger. The servo valve is coupled to receive a spring force and is configured, upon receipt thereof, to control the first force that is supplied to the first piston. The second piston engages the adjustable hangar and is coupled to receive fuel at the discharge pressure. The second piston is configured to supply a pressure control force to the adjustable hangar that opposes the hangar position force. The electromechanical actuator is coupled to receive the hanger position commands and is configured, in response thereto, to control the first force that is supplied to the first piston. The electromechanical actuator includes an electric motor, an actuator, and a bias spring. The electric motor is configured to be selectively energized and de-energized. The electric motor is configured to supply a actuation drive torque upon being selectively energized and hold position upon being de-engergized. The actuator is coupled to receive the actuation drive torque from the electric motor and control the first force that is supplied to the first piston. The bias spring is coupled between the actuator and the servo valve and is configured to supply the spring force to the servo valve.

In yet another exemplary embodiment, an electrically servoed metering pump includes a variable displacement piston pump and a hanger actuator. The variable displacement piston pump includes an adjustable hanger that is movable to a plurality of positions. The variable displacement piston pump is configured to receive a drive torque and, upon receipt of the drive torque, to supply fluid at a flow rate that is dependent on drive speed and adjustable hanger position. The hanger actuator is adapted to receive hanger position commands and is configured, in response thereto, to move the adjustable hanger to the commanded position. The hanger actuator includes an electromechanical actuator, a first piston, a second piston, and a servo valve a bias spring. The electromechanical actuator is integral with the pump, is coupled to receive the hanger position commands and is configured, in response thereto, to control movement of the adjustable hanger. The first piston engages the adjustable hangar and is coupled to receive a first force. The first piston is responsive to the first force to supply a hangar position force to the adjustable hanger. The second piston engages the adjustable hangar and is coupled to receive fuel at the discharge pressure. The second piston is configured to supply a pressure control force to the adjustable hangar that opposes the hangar position force. The servo valve is coupled to receive a spring force and is configured, upon receipt thereof, to control the first force that is supplied to the first piston. The bias spring is coupled between the actuator and the servo valve and is configured to supply the spring force to the servo valve.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description. In this regard, although an embodiment of the invention is described as being implemented in an aircraft, it will be appreciated that the invention may be implemented in numerous and varied end-use environments where fuel flow to a gas turbine engine is controlled.

Figure 1:
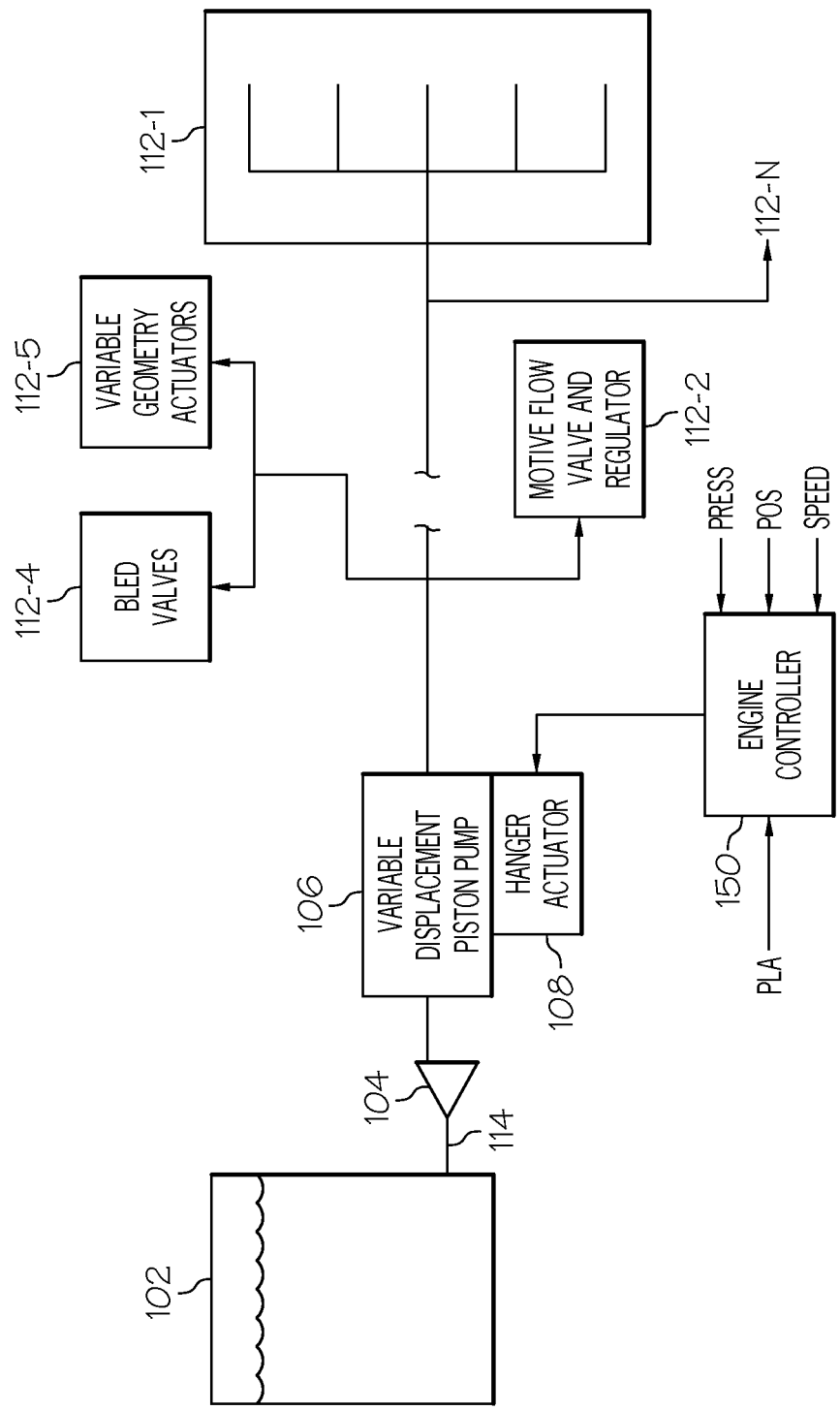
FIG. 1 is a simplified schematic diagram of an exemplary embodiment of a fuel delivery and control system for a gas turbine engine.

Turning now to FIG. 1, a simplified schematic diagram of one embodiment of a fuel delivery and control system for a gas turbine engine, such as a turbofan jet aircraft engine, is depicted. The system 100 includes a fuel source 102, one or more pumps 104, 106, and hangar actuator 108, and an engine controller 150. The fuel source 102, which is preferably implemented as one or more tanks, stores fuel that is to be supplied to a plurality of fuel loads 112 (e.g. 112-1, 112-2, 112-3, . . . 112-N). It will be appreciated that the number and type of fuel loads may vary, and may include one or more of a gas turbine engine combustor zone and associated nozzles 112-1, a motive flow valve and regulator 112-2, one or more variable geometry actuators 112-3, and one or more bleed valves 112-4, just to name a few.

A supply line 114 is coupled to the fuel source 102 and, via the just-mentioned pumps 104, 106, delivers the fuel to the fuel loads 112. It is noted that the supply line 114 is, for convenience, depicted and described with a single reference numeral. However, it will be appreciated that the system 100 is implemented using separate sections of piping, though a single section is certainly not prohibited. It will additionally be appreciated that a pressurizing and shutoff valve, although not depicted or described herein, may be disposed in the supply line 114 downstream of the pumps 104, 106. The pressurizing-and-shutoff valve, if included, functions to ensure there is a minimum system pressure magnitude in portions of the supply line 114, and shuts when the pressure falls below this minimum pressure magnitude.

Each of the one or more pumps 104, 106 is positioned in flow-series in the supply line 114 and take a suction on the fuel source 102. In the depicted embodiment, two engine-driven pumps are used and include a boost pump 104, such as a relatively low horsepower centrifugal pump, and a high pressure pump 106, such as a variable displacement piston pump. The boost pump 104 takes a suction directly on the fuel source 102 and provides sufficient suction head for the high pressure pump 106. The high pressure pump 106, a preferred embodiment of which will be described in more detail further below, then supplies the fuel at a relatively high pressure to the remainder of the supply line 114. Although not depicted, it will be appreciated that the system 100 may additionally include a low pressure pump within the fuel tank(s) 102 to supply fuel to the boost pump 104.

The high pressure pump 106, as noted above, is preferably a variable displacement piston pump, which includes an adjustable hanger. As is generally known, a variable displacement piston pump can be adjusted to increase or decrease the amount of fluid it supplies, and the discharge pressure at which it supplies the fluid. More specifically, the adjustable hanger, or swash plate as it is sometimes referred to, is coupled to a plurality of non-illustrated pistons that are disposed, one each, in a plurality of non-illustrated cylinders. The stroke of the pistons in the cylinders, and thus the flow rate and discharge pressure of the variable displacement piston pump 106, may be varied by varying the position of the adjustable hanger. The position of the adjustable hanger is varied by the hanger actuator 108.

The hangar actuator 108 is coupled to receive hangar position commands that are supplied from the engine controller 150. The hangar actuator 108, in response to the hangar position commands received from the engine controller 150, moves the adjustable hanger to the commanded position. The hangar actuator 108 may be variously configured to implement this functionality. One particular configuration, which is depicted more clearly in FIG. 2, will now be described.

Figure 4:
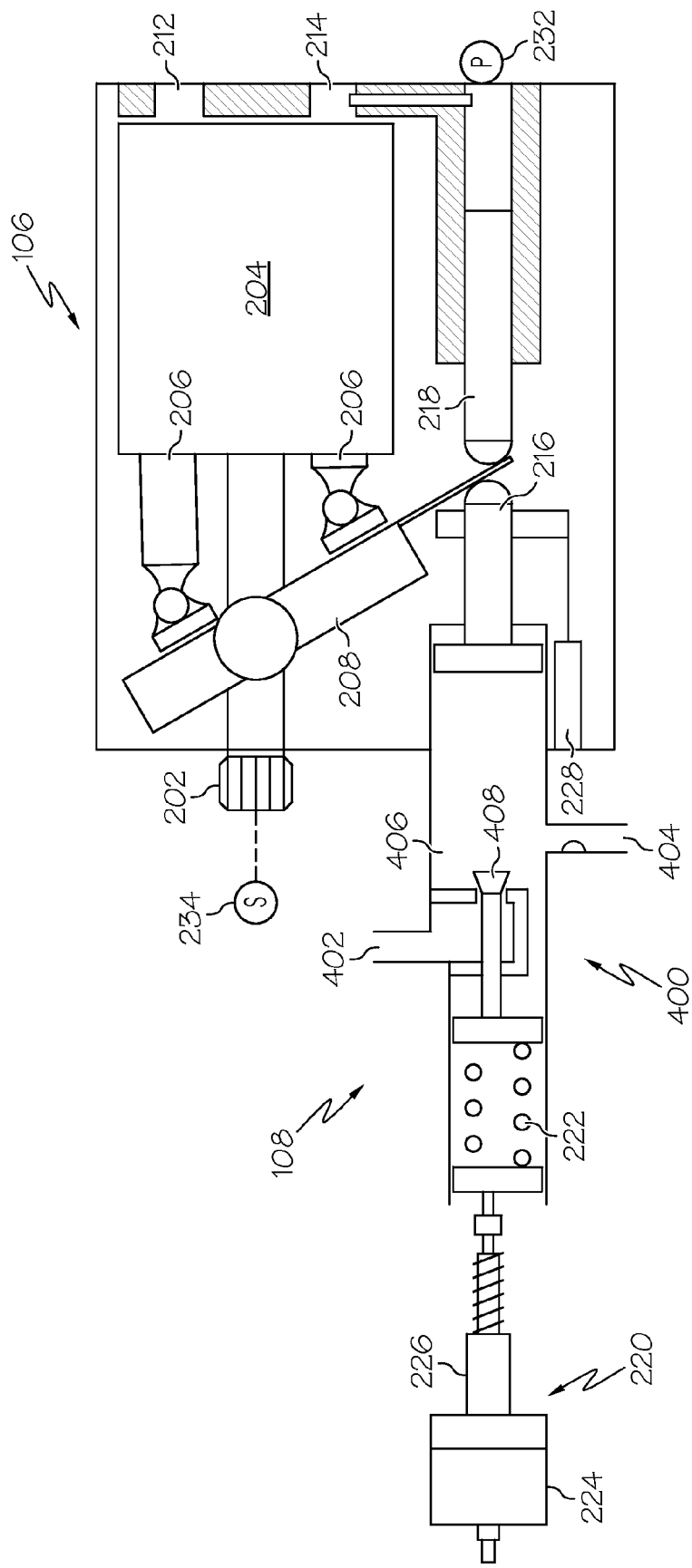
FIG. 4 is a functional block diagram of a portion of the fuel delivery and control system of FIG. 1 that depicts another embodiment of an electrically servoed metering pump in more detail.

Another particular configuration, which is depicted in FIG. 4, will subsequently be described further below.

Figure 2:
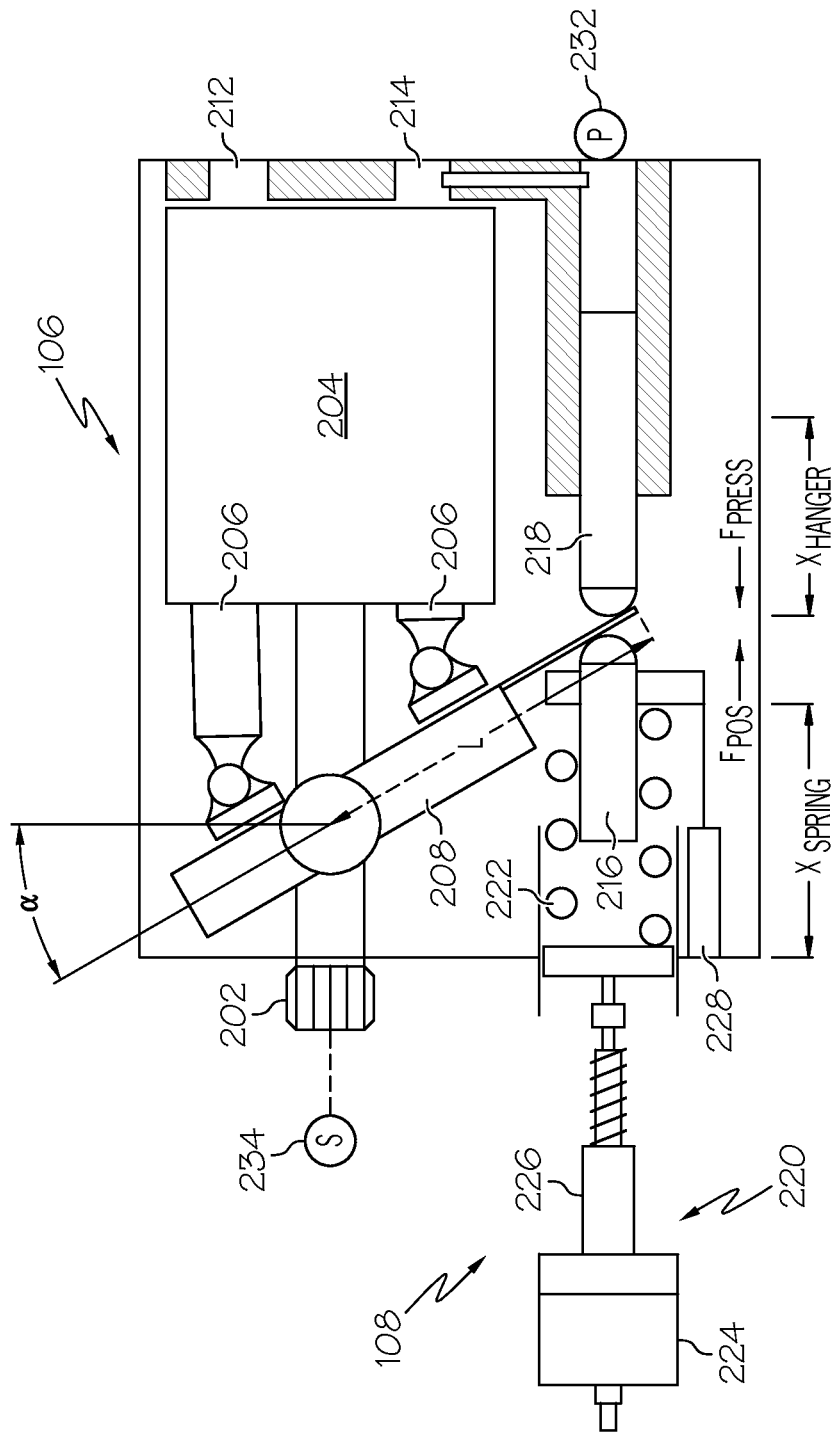
FIG. 2 is a functional block diagram of a portion of the fuel delivery and control system of FIG. 1 that depicts an embodiment of an electrically servoed metering pump in more detail.

Turning now to FIG. 2, the variable displacement piston pump 106 and hangar actuator 108 are shown in more detail. The variable displacement piston pump 106 includes an input shaft 202, a cylinder block 204, a plurality of pistons 206 (only two shown), and an adjustable hangar 208. The input shaft 202 is coupled to receive a drive torque from a motive power source such as, for example, the gearbox of a non-illustrated gas turbine engine. The input shaft 202 is coupled to the cylinder block 204 and thus, upon receipt of the drive torque, causes the cylinder block 204 to rotate at a rotational speed.

The cylinder block 204 includes a plurality of non-depicted piston cylinders. The pistons 206 are disposed, one each, within one of the plurality of piston cylinders. Thus, as the cylinder block 204 rotates, the piston cylinders rotate past an intake port 212 and a discharge port 214. The pistons 206 are coupled to the adjustable hangar 208 and thus, as the cylinder block 204 rotates, undergo an oscillatory displacement within their respective cylinders. This oscillatory displacement draws fluid into the intake port 212 and discharges the fluid out the discharge port 214 at a relatively higher discharge pressure.

As is generally known, the flow rate of a variable displacement piston pump 106 are functions of pump rotational speed and the position of the adjustable hangar 208 (e.g., hangar angle ($\alpha$)). The rotational speed of the pump 106 is controlled by the rotational speed of the motive power source (e.g., gas turbine engine). The position of the adjustable hangar 208, as noted above, is controlled by the hangar actuator 108, an embodiment of which will now be described.

The hangar actuator 108 includes a first piston 216, a second piston 218, and an electromechanical actuator 220. The first piston 216 engages the adjustable hangar 208 and is coupled to receive a first force. The first piston 216 is responsive to the first force to supply a hangar position force ($F_{POS}$) to the adjustable hanger 208. The second piston 218 also engages the adjustable hangar 208, and is in fluid communication with the discharge port 214. Thus, the second piston receives fuel at the discharge pressure of the pump 106, and supplies a pressure control force ($F_{PRESS}$) to the adjustable hangar 208 that opposes the hangar position force ($F_{POS}$). The electromechanical actuator 220 is coupled to receive the hanger position commands that are supplied from the engine controller 150. The electromechanical actuator 220 is configured, in response to the position commands, to control the first force that is supplied to the first piston 216.

In the embodiment depicted in FIG. 2, the first force is supplied to the first piston 216 from a bias spring 222 that is disposed between the electromechanical actuator 220 and the first piston 216. It may thus be appreciated that the electromechanical actuator 220 sets the bias spring 222 to supply the desired magnitude of the first force that is supplied to the first piston 216, and hence the hangar position force ($F_{POS}$) that the first piston 216 supplies to the adjustable hanger 208.

It will be appreciated that the electromechanical actuator 220 may be variously configured to implement its functionality. In the depicted embodiment, however, the electromechanical actuator 220 includes an electric motor 224 and an actuator 226. The electric motor 224 may be implemented using any one of numerous types of DC or AC motors. In a particular preferred embodiment, a brushless DC motor is used. Nonetheless, the electric motor 224 is configured to be selectively energized from a non-illustrated power source and, upon being energized, to supply an actuation drive torque to the actuator 226.

The actuator 226 is coupled to, or otherwise engages the bias spring 222 and, upon receipt of the drive torque, sets the bias spring 222 to control the first force that is supplied to the first piston 216. The actuator 226 may be variously configured, but in a particular embodiment it is implemented as a linear actuator, such as a ball screw, roller screw, or acme screw type of actuator.

Figure 3:
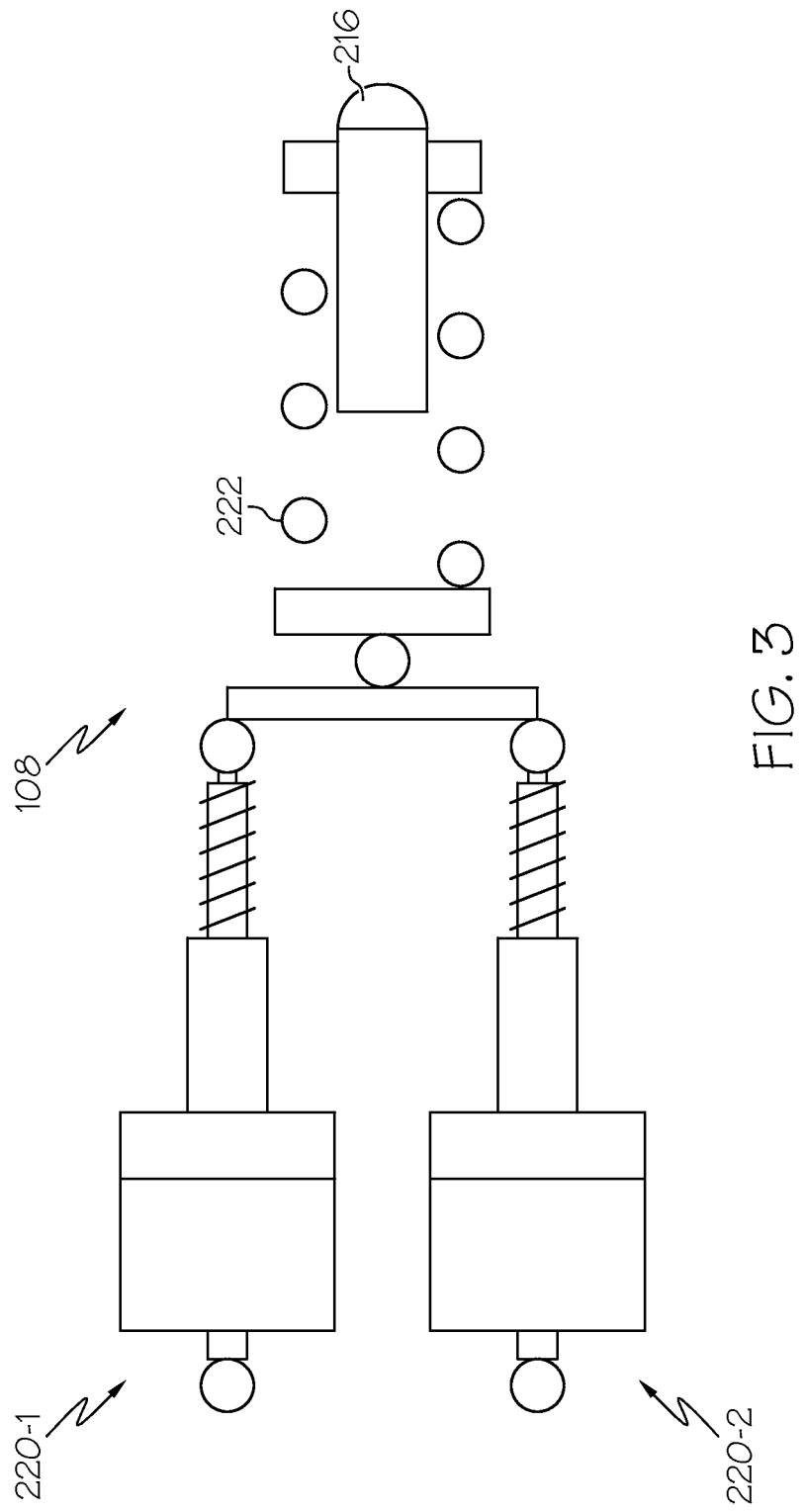
FIG. 3 depicts an alternative configuration of an exemplary electromechanical actuator.

The hangar actuator 108 that is depicted in FIG. 2 is implemented using a single electromechanical actuator 220. In an alternative embodiment, the electromechanical actuator 220 may be implemented with a plurality of electromechanical actuators 220. For example, in the embodiment depicted in FIG. 3, the hangar actuator 108 is implemented with two electromechanical actuators 220 (e.g., 220-1, 220-2). It will be appreciated that the hangar actuator 108 could be implemented with more than two electromechanical actuators 220, if needed or desired.

Returning once again to FIG. 2, it is seen that the variable displacement piston pump 106 additionally includes a position sensor 228 and a pressure sensor 232. The position sensor 228 is coupled to the variable displacement piston pump 106, and is configured supply a position signal representative of hangar position to the gas turbine engine controller 150. The position sensor 228 may be implemented using any one of numerous types of position sensing devices such as, for example, a linear variable differential transformer (LVDT), an optical sensor, a resistive sensor, a semiconductor sensor, just to name a few. Moreover, the position sensor 228 could be configured to sense the position of the adjustable hangar 208 either directly or indirectly.

The pressure sensor 232 is configured to sense the discharge pressure of the variable displacement piston pump 106 and supply a pressure signal representative thereof to the gas turbine engine controller 150. In the depicted embodiment, the pressure sensor 232 is coupled to the variable displacement piston pump 106. It will nonetheless be appreciated that this is merely exemplary and that the pressure sensor 232 could be variously disposed to sense the discharge pressure. No matter its specific location, it will be appreciated that the pressure sensor 232 may also be variously implemented using any one of numerous pressure sensors now known or developed in the future.

The engine controller 150 (see FIG. 1), among various other functions, supplies the hangar position commands to the hangar actuator 108. The engine controller 150 thereby controls the pressure, and concomitantly the flow rate, of fuel to the fuel loads 112. The engine controller 150, which may be configured, for example, as a Fully Automated Digital Engine Controller (FADEC), implements a closed-loop control scheme to control fuel flow. In particular, the engine controller 150 is configured to receive a fuel flow command from, for example, a throttle (or other pilot control). The engine controller 150 then determines the hangar position needed to supply the commanded fuel flow, and supplies the hangar position commands to the hangar actuator 108. The engine controller 150, using hangar position as feedback, controls to the hangar position to provide the commanded flow.

In addition to the above, and as is generally known, for a given hangar position, the flow rate of a variable displacement piston pump 106 are also a function of pump rotational speed. Thus, as FIG. 2 further depicts, the system 100 additionally includes a pump speed sensor 234. The pump speed sensor 234 is configured to sense the rotational speed of the variable displacement piston pump 106, and to supply a speed signal representative thereof to the gas turbine engine controller 150. The pump speed sensor 234 may be implemented using any one of numerous speed sensors now known or developed in the future, and may be configured to sense pump rotational speed directly or indirectly. For example, the pump speed sensor 234 may be configured to directly sense the rotational speed of the gas turbine engine or a component within the engine, from which the engine controller 150 may determine pump rotational speed.

Figure 5:
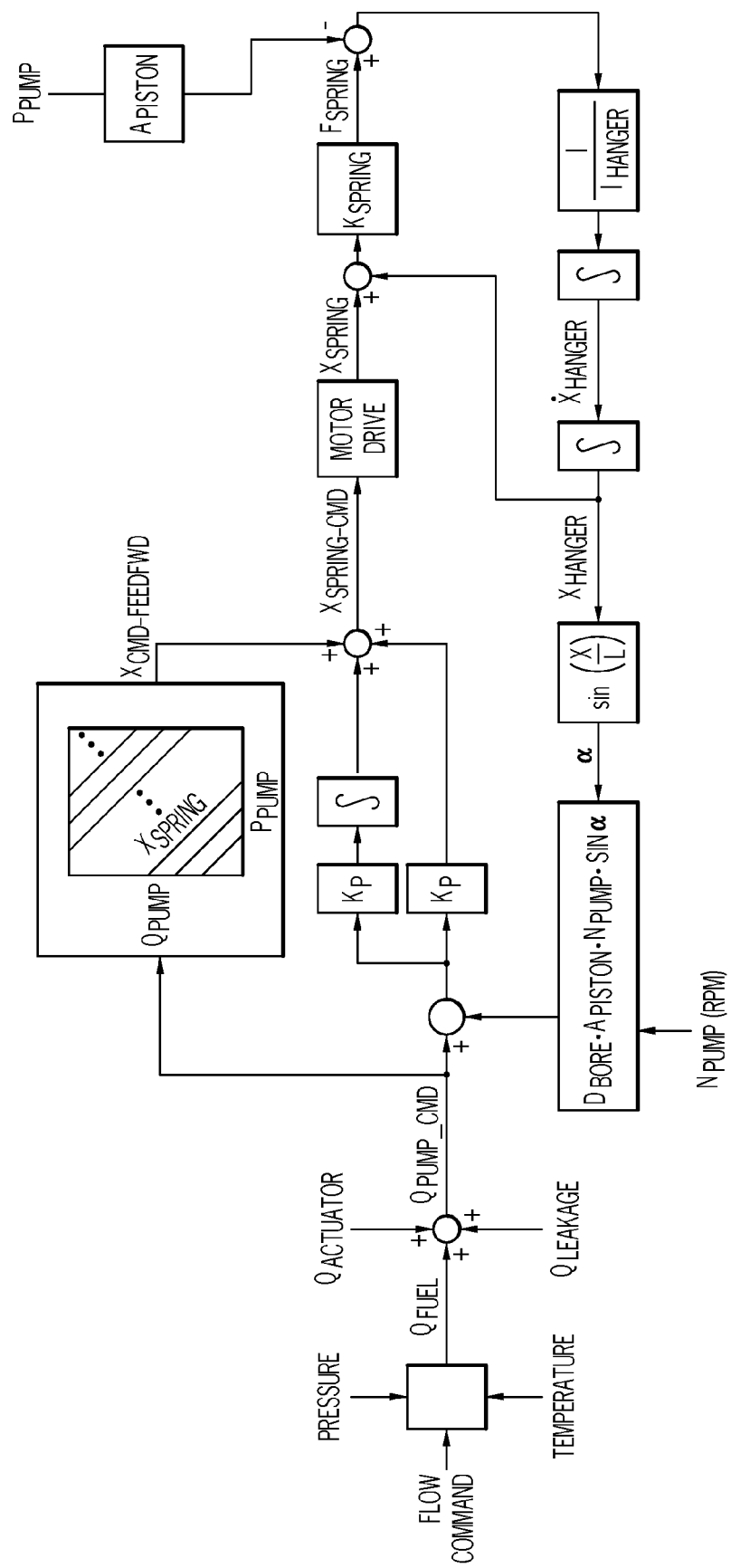
FIG. 5 is a functional block diagram of an exemplary control that may be used to control the electrically servoed metering pump of FIGS. 2 and 4.

Before proceeding further, it will be appreciated that the specific control scheme that is implemented in the engine controller 150 may vary. For completeness, a functional block diagram of one exemplary control scheme that may be implemented is depicted in FIG. 5.

Referring now to FIG. 4, an alternative embodiment of the hangar actuator 108 is depicted and will be described. Before doing so, however, it is noted that like reference numerals in FIGS. 2 and 4 refer to like parts, and that a description of the like parts will not be repeated. In this alternative embodiment, the electromechanical actuator 220 also sets a bias spring 222, but in this case the bias spring 222 supplies a spring force to a servo valve 400. The servo valve 400 in turn supplies the first force to the first piston 216. To implement this functionality, the servo valve 400 includes a fluid inlet 402, a fluid outlet 404, a control chamber 406 in fluid communication between the fluid inlet 402 and fluid outlet 404, and a valve 408 disposed within the control chamber 406. The bias spring 222 engages and supplies the spring force to the valve 408. The valve 408, in response to the spring force, moves to control fluid flow supplied from, for example, the outlet of the high pressure pump 106, into and through the control chamber 406, to thereby control fluid pressure within the control chamber 406. The fluid pressure in the control chamber 406 acts on, and thereby supplies the first force to, the first piston 216. This latter embodiment allows for a higher gain system and smaller electric motor(s) on the electromechanical actuator(s).

The gas turbine engine fuel supply system and electrically servoed fuel metering pump that are disclosed herein does not increase fuel temperature to undesirable levels during operation and/or does not rely on additional heat exchangers.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel metering system for supplying fuel to a load, comprising:
   a gas turbine engine controller adapted to receive throttle input commands and configured, in response thereto, to supply hanger position commands;
   a variable displacement piston pump including an adjustable hanger that is movable to a plurality of positions, the variable displacement piston pump configured to receive a drive torque and, upon receipt of the drive torque, to supply fuel to the load at a flow rate and a discharge pressure that is dependent on drive speed and adjustable hanger position;
   a hanger actuator coupled to receive the hanger position commands and configured, in response thereto, to move the adjustable hanger to the commanded position, the hanger actuator comprising:
   a first piston engaging the adjustable hangar and coupled to receive a first force, the first piston responsive to the first force to supply a hangar position force to the adjustable hanger;
   a servo valve coupled to receive a spring force and configured, upon receipt thereof, to control the first force that is supplied to the first piston;
   a second piston engaging the adjustable hangar and coupled to receive fuel at the discharge pressure, the second piston configured to supply a pressure control force to the adjustable hangar that opposes the hangar position force; and
   an electromechanical actuator coupled to receive the hanger position commands and configured, in response thereto, to control the first force that is supplied to the first piston, the electromechanical actuator comprising:
   an electric motor configured to be selectively energized and, upon being selectively energized, supply an actuation drive torque,
   a linear actuator coupled to receive the actuation drive torque from the electric motor and control the first force that is supplied to the first piston, and
   a bias spring coupled between the linear actuator and the servo valve and configured to supply the spring force to the servo valve.

2. The system of claim 1, further comprising:
   a position sensor coupled to the variable displacement piston pump and configured to supply a position signal representative of hangar position to the gas turbine engine controller.

3. The system of claim 2, wherein the gas turbine engine controller is configured to supply the hanger position commands in response to the position signal.

4. The system of claim 3, further comprising:
   a pump speed sensor operable to sense variable displacement piston pump speed and to supply a speed signal representative thereof to the gas turbine engine controller.

5. The system of claim 4, wherein the gas turbine engine controller is configured to supply the hanger position commands additionally in response to the speed signal.

6. The system of claim 1, further comprising:
   a pressure sensor configured to sense the discharge pressure and supply a pressure signal representative thereof to the gas turbine engine controller.

7. A fuel metering system for supplying fuel to a load, comprising:
   a variable displacement piston pump including an adjustable hanger that is movable to a plurality of positions, the variable displacement piston pump configured to receive a drive torque and, upon receipt of the drive torque, to supply fuel to the load at a flow rate and a discharge pressure that are dependent on drive speed and adjustable hanger position;
   a position sensor coupled to the variable displacement piston pump and configured supply a position signal representative of hangar position;
   a pressure sensor configured to sense the discharge pressure and supply a pressure signal representative thereof;
   a gas turbine engine controller coupled to receive throttle input commands and the position signal and configured, in response thereto, to supply hanger position commands;

a hanger actuator coupled to receive the hanger position commands and configured, in response thereto, to move the adjustable hanger to the commanded position, the hanger actuator comprising:
  a first piston engaging the adjustable hangar and coupled to receive a first force, the first piston responsive to the first force to supply a hangar position force to the adjustable hanger;
  a servo valve coupled to receive a spring force and configured, upon receipt thereof, to control the first force that is supplied to the first piston;
  a second piston engaging the adjustable hangar and coupled to receive fuel at the discharge pressure, the second piston configured to supply a pressure control force to the adjustable hangar that opposes the hangar position force; and
  an electromechanical actuator coupled to receive the hanger position commands and configured, in response thereto, to control the first force that is supplied to the first piston, the electromechanical actuator comprising:
    an electric motor configured to be selectively energized and de-energized, the electric motor configured to (i) supply an actuation drive torque upon being selectively energized and (ii) hold position upon being de-energized,
    a linear actuator coupled to receive the actuation drive torque from the electric motor and control the first force that is supplied to the first piston, and
    a bias spring coupled between the linear actuator and the servo valve and configured to supply the spring force to the servo valve.

\* \* \* \* \*